US008123060B2

(12) United States Patent  (10) Patent No.: US 8,123,060 B2
Obergoenner  (45) Date of Patent: Feb. 28, 2012

(54) WOOD JOINT FOR A BARRELHEAD

(76) Inventor: Donald Obergoenner, Cape Giradeau, MO (US)

( * ) Notice: Subject to any disclaimer, the term of this patent is extended or adjusted under 35 U.S.C. 154(b) by 0 days.

(21) Appl. No.: 12/657,035

(22) Filed: Jan. 12, 2010

(65) Prior Publication Data

US 2010/0155369 A1    Jun. 24, 2010

Related U.S. Application Data

(62) Division of application No. 11/417,744, filed on May 4, 2006, now Pat. No. 7,654,401.

(60) Provisional application No. 60/681,271, filed on May 16, 2005.

(51) Int. Cl.
*B65D 25/00* (2006.01)

(52) U.S. Cl. .......... 217/65; 217/72; 52/590.1; 52/592.1; 52/592.2; 403/311; 403/381; 24/30; 24/20 EE

(58) Field of Classification Search .......... 52/592.2, 52/578, 590.1, 592.1; 144/354; 24/30, 20 EE; 217/65, 96, 88, 72; 403/311.381
See application file for complete search history.

(56) References Cited

U.S. PATENT DOCUMENTS

| | | | |
|---|---|---|---|
| 55,137 A * | 5/1866 | Merril ............................ 217/96 |
| 58,451 A | 10/1866 | Merrill | |
| 338,379 A | 3/1886 | Allgire | |
| 483,478 A | 9/1892 | Schmidt | |
| 883,049 A * | 3/1908 | Piver ............................. 52/578 |
| 1,032,674 A | 7/1912 | Holland | |
| 1,052,178 A * | 2/1913 | Robison ......................... 217/51 |
| 1,158,307 A * | 10/1915 | Schmidt ....................... 403/270 |
| 1,476,041 A | 12/1923 | Bolinder | |
| 1,540,128 A * | 6/1925 | Ross Houston ................ 52/578 |
| 1,803,127 A * | 4/1931 | O'Connell et al. ............. 217/78 |
| 1,976,173 A | 10/1934 | Hutchings | |
| 2,000,391 A | 5/1935 | Hutchings | |
| 2,142,305 A * | 1/1939 | Davis ......................... 52/592.1 |
| 2,144,831 A * | 1/1939 | Burns ........................ 192/107 R |
| 3,667,639 A * | 6/1972 | Pfeil ............................... 217/4 |
| 3,731,445 A * | 5/1973 | Hoffmann et al. ............. 52/391 |
| 4,328,839 A * | 5/1982 | Lyons et al. .................. 138/120 |
| 4,640,437 A * | 2/1987 | Weingartner ............ 220/560.12 |
| 5,791,114 A * | 8/1998 | Mandel ....................... 52/591.3 |
| 6,311,447 B1 | 11/2001 | Lindal | |
| 6,345,481 B1 * | 2/2002 | Nelson ........................ 52/592.2 |
| 6,616,002 B2 * | 9/2003 | Weil ............................. 217/76 |
| 6,647,689 B2 | 11/2003 | Pletzer et al. | |
| 2003/0041545 A1 | 3/2003 | Stanchfield | |
| 2003/0154681 A1 * | 8/2003 | Pletzer et al. .................. 52/578 |
| 2004/0253051 A1 * | 12/2004 | Napp ........................... 403/331 |

* cited by examiner

*Primary Examiner* — Jeanette E Chapman
*Assistant Examiner* — James Buckle, Jr.
(74) *Attorney, Agent, or Firm* — David H. Chervitz

(57) ABSTRACT

A wood joint is disclosed which comprises a first heading having a first profile comprising an upper lobe, a lower lobe, and a valley section intermediate the lobes, a second heading having a second profile comprising an upper socket, a lower socket, and a ridge section intermediate the sockets, and the first profile for engaging the second profile for securing the headings together.

15 Claims, 3 Drawing Sheets

WOOD JOINT FOR A BARRELHEAD

RELATED APPLICATION

This application claims benefit of U.S. provisional patent application No. 60/681,271, that was filed on May 16, 2005, which is incorporated herein by reference and is a Divisional application of prior U.S. application Ser. No. 11/417,744, that was filed on May 4, 2006, now U.S. Pat. No. 7,654,401.

BACKGROUND OF THE INVENTION

This invention relates to a wood joint and more particularly to a wood joint for use in the manufacture of a barrelhead.

A barrel typically comprises a barrel body and a pair of opposing barrelheads. The barrelheads are used to cap the body and to provide for a water-tight seal for any liquid stored within the barrel. The barrelheads are usually constructed of pieces of wood, referred to as headings, joined together by use of wood joints. Construction of a barrelhead entails a number of headings being joined together and then cutting the joined headings into a circle. The circle is sized and shaped to fit on either end of the barrel body to seal the barrel and the contents stored therein. Examples of wood joints that have been employed are tongue and groove joints, keynote joints, square joints, and double tongue and double groove joints. However, one problem associated with such wood joints is that they are subject to failure. In particular, the joints are not water-tight and liquid stored within the barrel is able to leak or seep through the joint. In a worst case situation, with the complete failure of the joint, the liquid stored within the barrel may flow out of the barrel. As can be appreciated, if a liquid such as wine is being aged in the barrel and is allowed to escape from the barrel then the yield and profit will decrease. Further, if air is allowed into the barrel, then the contents of the barrel are subject to spoilage.

Although such wood joints have been used in the past, these wood joints have been difficult to form and have failed in use. For example, these wood joints require that square and sharp edges be formed when cutting the wood to form the headings. Forming square and sharp edges can be difficult and the edges are susceptible to chipping. If chipping does occur, it may be difficult to engage the pieces. Also, it is time consuming to prepare square and sharp edges and this adds to the cost of manufacturing headings and barrelheads.

Therefore, it would be desirable to have a joint that is easy to form and provides for a water-tight seal. The present invention is designed to obviate and overcome many of the disadvantages and shortcomings associated with prior wood joints. Moreover, the present invention is designed to provide a wood joint that forms a water-tight seal.

SUMMARY OF THE INVENTION

In one form of the present invention, a wood joint comprises a first heading having a first profile comprising an upper lobe, a lower lobe, and a valley section intermediate the lobes, a second heading having a second profile comprising an upper socket, a lower socket, and a ridge section intermediate the sockets, and the first profile for engaging the second profile for securing the headings together.

In another form of the present invention, a heading for use in forming a barrelhead having a water tight joint comprises a first side edge having a first profile comprising an upper lobe and a lower lobe, and a second side edge having a second profile comprising an upper socket and a lower socket.

In yet another form of the present invention, a wood joint comprises a first heading having a first profile comprising an upper socket, a lower socket, and a ridge section intermediate the sockets, a second heading having a second profile comprising an upper socket, a lower socket, and a ridge section intermediate the sockets, and a spline member having a pair of tongue portions with each of the tongue portions having an upper lobe and a lower lobe, the spline member for fitting within the first profile and the second profile.

In light of the foregoing comments, it will be recognized that a principal object of the present invention is to provide an improved wood joint.

A further object of the present invention is to provide a wood joint that is of simple construction and design and which can be easily employed with highly reliable results.

Another object of the present invention is to provide a wood joint that prevents any liquid from passing through the joint.

A still further object of the present invention is to provide a wood joint that can be used to form or construct a barrelhead.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
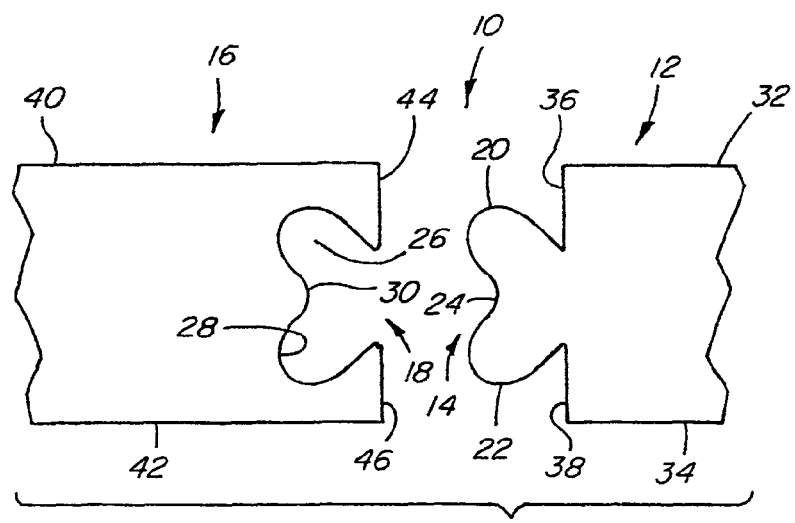
FIG. 1 is a partial cross sectional view of a wood joint constructed according to the present invention.

Referring now to the drawings, wherein like numbers refer to like items, number 10 identifies a preferred embodiment of a joint constructed according to the present invention. With reference now to FIG. 1, the joint 10 is shown to comprise a first heading 12 having a first profile 14 and a second heading 16 having a second profile 18. The first profile 14 and the second profile 18 are complementary to each other and may be joined together to form the joint 10 and to connect the first heading 12 to the second heading 16. The first profile 14 has an upper lobe or protrusion 20, a lower lobe or protrusion 22, and an intermediate section or valley 24. The valley 24 is between the upper lobe 20 and the lower lobe 22. The second profile 16 has an upper recess or socket 26, a lower recess or socket 28, and an intermediate section or ridge 30. The intermediate section 30 is between the socket 26 and the socket 28. The first profile 14 is a tongue or a male portion and the second profile 18 is a groove or a female portion. The first profile 14 is adapted to be mated with the second profile 18 to securely engage the first heading 12 to the second heading 16.

The first heading 12 has a top surface 32 and a bottom surface 34. The top surface 32 is adapted for facing outside of a barrel (not shown) and the bottom surface 34 is adapted to face the interior of a barrel (not shown) as will be explained further herein. The first profile 14 also has an upper edge 36 and a lower edge 38. The upper edge 36 is formed between the top surface 32 and the upper lobe 20 and the lower edge 38 is formed between the bottom surface 34 and the lower lobe 22. The second heading 16 has a top surface 40 and a bottom surface 42. The top surface 40 is adapted for facing outside of a barrel (not shown) and the bottom surface 42 is adapted to face the interior of a barrel (not shown) as will be discussed further herein. The second profile 18 has an upper edge 44 and a lower edge 46. The upper edge 44 is formed between the top surface 40 and the upper socket 26 and the lower edge 46 is formed between the bottom surface 42 and the lower socket 28. The upper edges 36 and 44 and the lower edges 38 and 46 butt up against each other when the first heading 12 and the second heading 16 are engaged. When the headings 12 and 16 are connected together in this manner a water-tight seal is formed between the headings 12 and 16 by use of the joint 10. In particular, any liquid that comes in contact with the bottom surfaces 34 and 42 may try to escape through the joint 10. However, the liquid that enters into the joint 10 swells the wood of the profiles 14 and 18 to prevent any liquid from leaking out between the upper edges 36 and 44.

Figure 2:
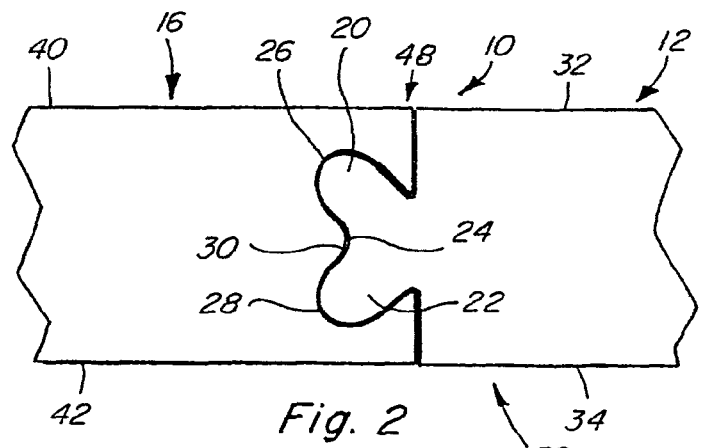
FIG. 2 is a partial cross sectional view of the wood joint shown in FIG. 1 with the wood joint being connected.

FIG. 2 illustrates the joint 10 with the first heading 12 and the second heading 16 being connected together. The first profile 14 is mated with the second profile 18 with the upper lobe 20 being inserted into the upper socket 26, the lower lobe 22 being inserted into the lower socket 28, and the ridge 30 fitting into the valley 24. With the headings 12 and 16 connected together, the upper surfaces 32 and 40 form a continuous upper surface 48 and the lower surfaces 34 and 42 form a continuous lower surface 50. The lower surface 50 may face the interior of a barrel and may contact any liquid being stored within the barrel. The joint 10 is used to prevent any liquid from escaping from the lower surface 50 to the upper surface 48.

Figure 3:
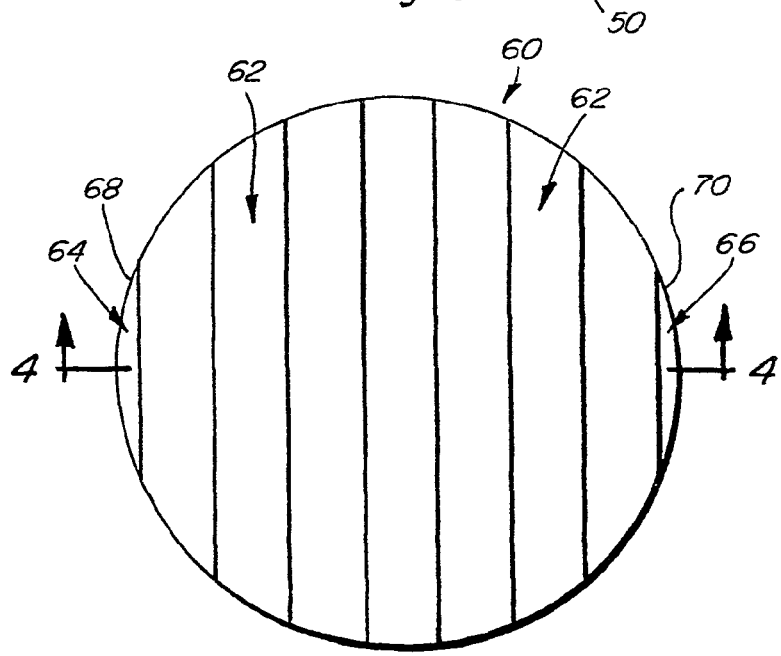
FIG. 3 is a top view of a barrelhead formed of headings having the wood joint of the present invention.

With reference now to FIG. 3, a top view of a barrelhead 60 is shown. The barrelhead 60 is constructed using a plurality of headings 62 and a pair of end heading members 64 and 66. Although not shown in this particular view, each of the headings 62 has a joint corresponding to the joint 10 and the profiles 14 and 18. The end heading member 64 may have a profile similar to the profile 18 and the end heading member 66 may have a profile similar to the profile 14, as will be further illustrated. The end heading member 64 has an edge 68 that does not have a profile similar to either of the profiles 14 and 18. Further, the end heading member 66 has an edge 70 that does not have a profile corresponding to either of the profiles 14 and 18. The headings 62, 64, and 66 are initially connected together to form a slab that is then cut to the shape of the barrelhead 60. The width of the headings 62 may vary so that various sized pieces of wood may be used to form the headings 62.

Figure 4:
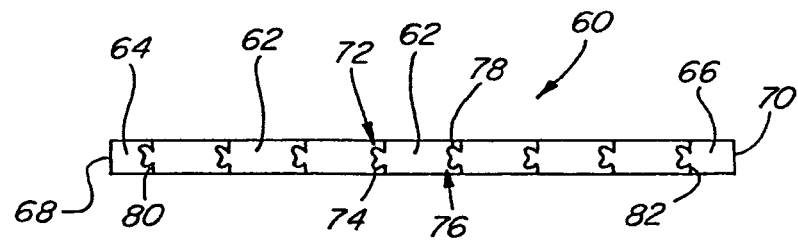
FIG. 4 is a cross-sectional view of the barrelhead of FIG. 3 taken along the plane of line 4-4.

FIG. 4 is a cross-sectional view of the barrelhead 60 illustrated in FIG. 3. The barrelhead 60 is formed from a plurality of headings 62 and a pair of end heading members 64 and 66. Each of the headings 62 has a side 72 that has a first profile 74 that corresponds to the profile 14. Each of the headings 62 has an opposite side 76 that has a second profile 78 that corresponds to the profile 18. In this manner the headings 62 are connected together. The end heading member 64 has the edge 68 that is shaped to be square. Also, the end heading member 66 has the edge 70 that is shaped to be square. The edges 68 and 70 allow the barrelhead to be formed so that there are no profiles 14 and 18 along the periphery of the barrelhead 60 which would cause any liquid to leak. However, the member 64 does have a female profile 80 that is similar to the profile 18. The profile 80 allows the member 64 to be connected to one of the headings 62. Also, the member 66 has a male profile 82 that corresponds to the profile 14. The member 66 may be connected to one of the headings by use of the profile 82.

Figure 5:
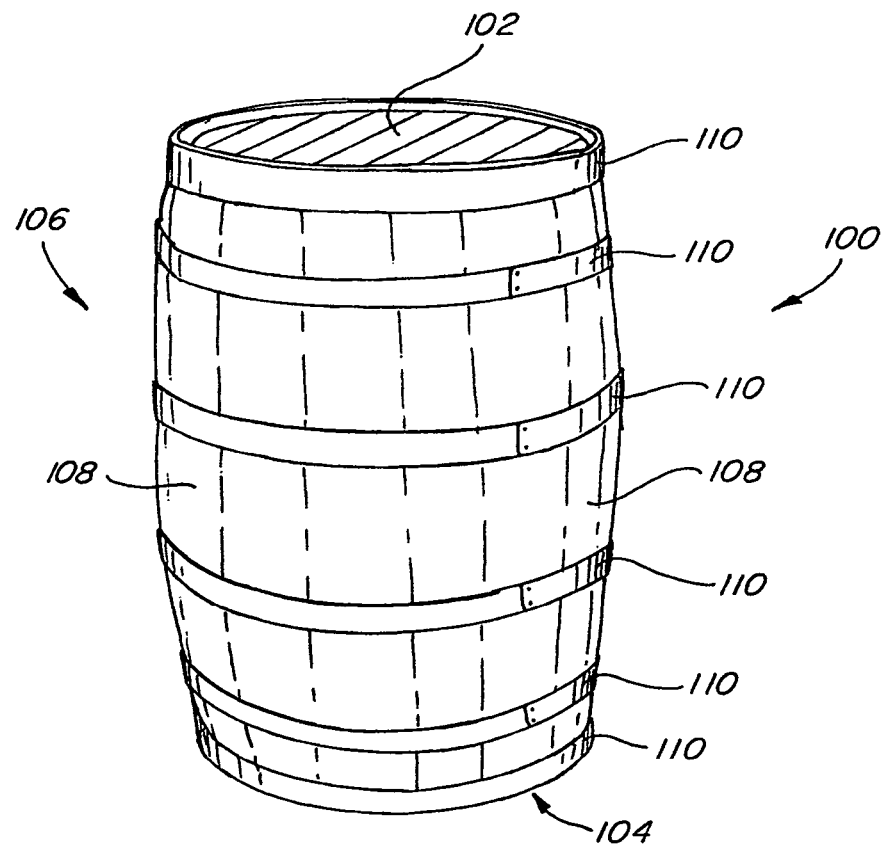
FIG. 5 is a perspective view of a barrel that is manufactured having barrelheads employing the wood joint of the present invention.

With particular reference now to FIG. 5, a barrel 100 is illustrated having a pair of barrelheads 102 and 104 constructed according to the present invention. The barrel 100 has a body 106 consisting of a plurality of staves 108 that are joined together and held in place by metal bands 110. As can be appreciated, the barrelheads 102 and 104 are constructed by use of the joint 10. Further, any liquid stored inside the barrel 100 is prevented from leaking out of the barrelheads 102 and 104 by use of the joint 10.

Figure 6:
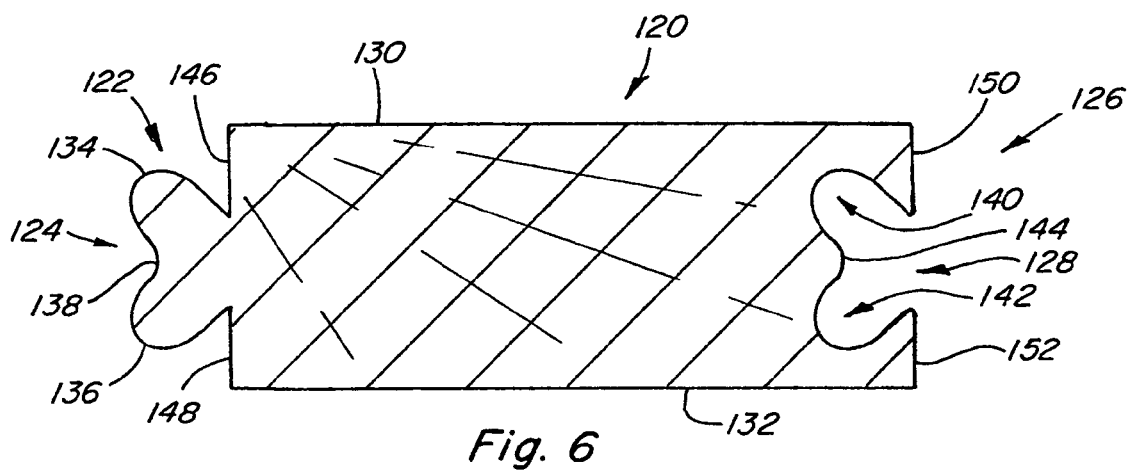
FIG. 6 is an end side view of a heading constructed according to the present invention.

FIG. 6 depicts an end side view of a heading 120 constructed according to the present invention. The heading 120 has a first side 122 having a first profile 124 and a second side 126 having a second profile 128. The first profile 124 is similar to the profile 14 and the second profile 128 is similar to the profile 18. The first profile 124 is a tongue portion and the second profile 128 is a groove portion. The heading 120 also has a top surface 130 and a bottom surface 132. The top surface 130 may be exposed to the air or the exterior of a barrel and the bottom surface 132 may be exposed to the interior of a barrel.

The first profile 124 has an upper lobe 134, a lower lobe 136, and an intermediate section or valley 138. The valley 138 is between the upper lobe 134 and the lower lobe 136. The first profile 124 is in the shape of a butterfly wing. The first profile 124 spans the length of the first side 122 of the heading 120. The second profile 128 has an upper socket 140, a lower socket 142, and an intermediate section or ridge 144. The intermediate section 144 is between the socket 140 and the socket 142. The second profile 128 is also in the shape of a butterfly wing. The second profile 128 extends along the entire length of the second side 126 of the heading 120.

The first profile 124 also has an upper edge 146 and a lower edge 148. The upper edge 146 is formed between the top surface 130 and the upper lobe 134 and the lower edge 148 is formed between the bottom surface 132 and the lower lobe 136. The second profile 128 has an upper edge 150 and a lower edge 152. The upper edge 150 is formed between the top surface 130 and the upper socket 140 and the lower edge 152 is formed between the bottom surface 132 and the lower socket 142.

As can be appreciated, a plurality of the headings 120 can be assembled together by mating the profiles 124 and 128 of adjacent headings 120 to form a portion of a barrelhead The profile 124 of one of the headings 120 fits into the profile 128 of an adjacent heading 120. In this manner, the upper lobe 134 fits into the upper socket 140, the lower lobe 136 fits into the lower socket 142, and the ridge portion 144 fits into the valley portion 138. The profiles 124 and 128 are fitted or mated together to form a water-tight seal. In particular, any fluid or liquid that comes into contact with the bottom surface 132 and that attempts to flow between the edges 148 and 152 will cause the first profile 124 to swell and then seal the lobes 134 and 136 against the sockets 140 and 142, to prevent any liquid from escaping between the edges 146 and 150.

Figure 7:
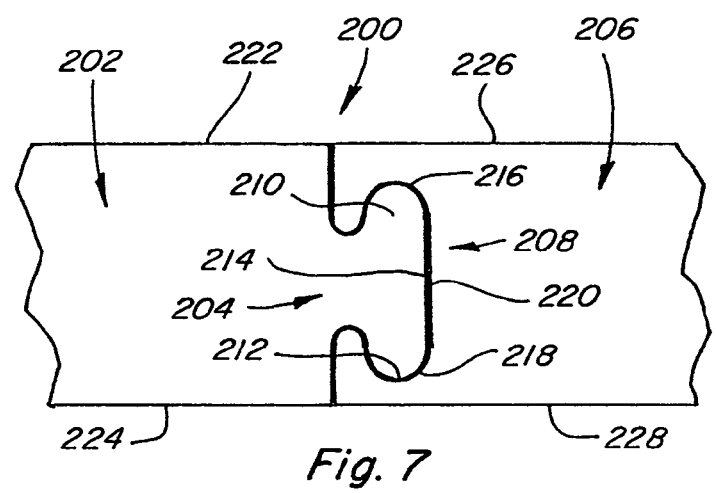
FIG. 7 is partial cross-sectional view of another preferred embodiment of a wood joint constructed according to the present invention.

With reference now to FIG. 7, another preferred embodiment of a joint 200 is shown. The joint 200 is illustrated having a first heading 202 having a first profile 204 and a second heading 206 having a second profile 208. The first profile 204 and the second profile 208 are complementary to each other and may be joined together to form the joint 200 and to connect the first heading 202 to the second heading 206. The first profile 204 is a knob like tongue portion and the second profile 208 is a knob like groove portion. The first profile 204 has an upper lobe 210, a lower lobe 212, and an intermediate flat portion 214. The second profile 208 has an upper socket 216, a lower socket 218, and an intermediate flat portion 220. The lobes 210 and 212 are adapted to fit into the sockets 216 and 218. Also, the flat portions 214 and 220 butt up to each other when the headings 202 and 206 are connected together by use of the joint 200. The heading 202 has an upper surface 222 and a bottom surface 224 and the heading 206 has an upper surface 226 and a bottom surface 228. The bottom surfaces 224 and 228 are positioned to face the interior of a barrel and may contact any liquid stored within the barrel.

When the headings 202 and 206 are connected together by use of the joint 200 a water-tight seal is formed between the headings 202 and 206. In particular, any liquid that comes in contact with the bottom surfaces 224 and 228 may try to escape through the joint 200. However, the liquid that enters into the joint 200 swells the wood of the profiles 204 and 208 to prevent any liquid from leaking out between the joint 200 to the upper surfaces 222 and 226.

Figure 8:
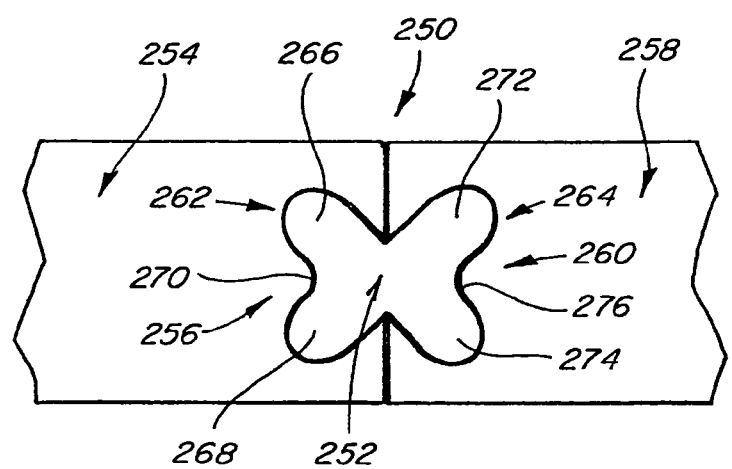
FIG. 8 is partial cross-sectional view of yet another preferred embodiment of a wood joint constructed according to the present invention.

FIG. 8 depicts another preferred embodiment of a joint 250 constructed according to the present invention. The joint 250 comprises a spline member 252 fitted between a first heading 254 having a first groove profile 256 and a second heading 258 having a second groove profile 260. The first groove profile 256 and the second groove profile 260 are similar in form to the profile 18. The spline member 252 comprises double sided tongue portions 262 and 264. The tongue portion 262 has an upper lobe 266, a lower lobe 268, and an intermediate valley portion 270. The tongue portion 264 is similar in construction to the tongue portion 262 and comprises an upper lobe 272, a lower lobe 274, and an intermediate valley portion 276. As can be appreciated, to construct the joint 250 the two headings 254 and 258 are positioned adjacent to each other and the spline member 252 is inserted into the space formed between the two groove profiles 258 and 260. In this manner, a barrelhead or a portion of a barrelhead may be constructed using the joint 250. Further, the joint 250 provides a water-tight seal in that any liquid that tries to flow between the headings 254 and 258 is stopped by the joint 250 by swelling of the lower lobes 268 and 276.

From all that has been said, it will be clear that there has thus been shown and described herein a wood joint which fulfills the various objects and advantages sought therefore. It will become apparent to those skilled in the art, however, that many changes, modifications, variations, and other uses and applications of the subject wood joint are possible and contemplated. All changes, modifications, variations, and other uses and applications which do not depart from the spirit and scope of the invention are deemed to be covered by the invention, which is limited only by the claims which follow.

What is claimed is:

1. A heading for use in forming a barrelhead having a water tight joint comprising an upper surface, a bottom surface, a first end, a second end, a first profile at the first end comprising an upper lobe, a lower lobe, a flat section intermediate the lobes, an upper socket portion adjacent the upper lobe with the upper socket portion extending to the upper surface, and a lower socket portion adjacent the lower lobe with the lower socket portion extending to the bottom surface, and a second profile at the second end comprising an upper socket, a lower socket, a flat section intermediate the sockets, an upper lobe portion adjacent to the upper socket with the upper lobe portion extending to the upper surface, and a lower lobe portion adjacent the lower socket with the lower lobe portion extending to the bottom surface.

2. The heading of claim 1 wherein a plurality of headings are joined together to form a barrelhead with the first profile of one of the headings for engaging with the second profile of another one of the headings.

3. The heading of claim 2 wherein any liquid is prevented from flowing from the bottom surfaces of the headings to the upper surfaces of the headings by the lower lobe of one heading and the lower lobe portion of another one of the headings swelling.

4. The heading of claim 2 wherein any liquid is prevented from flowing from the bottom surfaces of the headings to the upper surfaces of the headings by the upper lobe of one heading and the upper lobe portion of another one of the headings swelling.

5. The heading of claim 1 wherein the lower socket portion of the first profile forms a right angle at the bottom surface and the lower lobe portion of the second profile forms a right angle at the bottom surface.

6. A barrelhead having a water tight joint comprising:
a first heading having an upper surface, a bottom surface, a first profile comprising an upper lobe, a lower lobe, a flat section intermediate the lobes, an upper socket portion adjacent the upper lobe with the upper socket portion extending to the upper surface, and a lower socket portion adjacent the lower lobe with the lower socket portion extending to the bottom surface;
a second heading having an upper surface, a bottom surface, a second profile comprising an upper socket, a lower socket, a flat section intermediate the sockets, an upper lobe portion adjacent the upper socket with the upper lobe portion extending to the upper surface, and a lower lobe portion adjacent the lower socket with the lower lobe portion extending to the bottom surface; and
the first profile for engaging the second profile for securing the headings together for forming a water tight joint.

7. The barrelhead of claim 6 wherein the first heading further comprises a second profile comprising an upper socket, a lower socket, a flat section intermediate the sockets, an upper lobe portion adjacent the upper socket with the upper lobe portion extending to the upper surface, and a lower lobe portion adjacent the lower socket with the lower lobe portion extending to the bottom surface.

8. The barrelhead of claim 6 wherein the second heading further comprises a first profile comprising an upper lobe, a lower lobe, a flat section intermediate the lobes, an upper socket portion adjacent the upper lobe with the upper socket portion extending to the upper surface, and a lower socket portion adjacent the lower lobe with the lower socket portion extending to the bottom surface.

9. The barrelhead of claim 6 wherein any liquid is prevented from flowing from the bottom surfaces of the headings to the upper surfaces of the headings by the lower lobe of the first heading and the lower lobe portion of the second heading swelling.

10. The barrelhead of claim 9 wherein any liquid is prevented from flowing from the bottom surfaces of the headings to the upper surfaces of the headings by the upper lobe of the first heading and the upper lobe portion of the second heading swelling.

11. The barrelhead of claim 6 wherein any liquid is prevented from flowing from the bottom surfaces of the headings to the upper surfaces of the headings by the lower lobe of the first heading and the lower lobe portion of the second heading and the upper lobe of the first heading and the upper lobe portion of the second heading swelling.

12. A barrelhead having a water tight joint comprising:
- a first heading having an upper surface, a bottom surface, a first profile having a knob shaped tongue portion having an upper lobe, a lower lobe, a flat section intermediate the lobes, an upper socket portion adjacent the upper lobe with the upper socket portion extending to the upper surface, and a lower socket portion adjacent the lower lobe with the lower socket portion extending to the bottom surface;
- a second heading having an upper surface, a bottom surface, a second profile having a knob shaped socket portion having an upper socket, a lower socket, a flat section intermediate the sockets, an upper lobe portion adjacent the upper socket with the upper lobe portion extending to the upper surface, and a lower lobe portion adjacent the lower socket with the lower lobe portion extending to the bottom surface; and
- the first profile for engaging the second profile for securing the headings together for forming a water tight joint.

13. The barrelhead of claim 12 wherein the first heading further comprises a second profile comprising a knob like socket portion having an upper socket, a lower socket, a flat section intermediate the sockets, an upper lobe portion adjacent the upper socket with the upper lobe portion extending to the upper surface, and a lower lobe portion adjacent the lower socket with the lower lobe portion extending to the bottom surface.

14. The barrelhead of claim 12 wherein the second heading further comprises a first profile comprising a knob shaped tongue portion having an upper lobe, a lower lobe, a flat section intermediate the lobes, an upper socket portion adjacent the upper lobe with the upper socket portion extending to the upper surface, and a lower socket portion adjacent the lower lobe with the lower socket portion extending to the bottom surface.

15. The barrelhead of claim 12 wherein any liquid is prevented from flowing from the bottom surfaces of the headings to the upper surfaces of the headings by the lower lobe of the tongue portion of the first heading and the lower lobe portion of the socket portion of the second heading swelling.

* * * * *